(12) United States Patent
Lefebvre et al.

(10) Patent No.: US 12,385,414 B1
(45) Date of Patent: Aug. 12, 2025

(54) COMPRESSOR FRANGIBLE CONTAINMENT STRUCTURE

(71) Applicant: Pratt & Whitney Canada Corp., Longueuil (CA)

(72) Inventors: Guy Lefebvre, St-Bruno (CA); Michael Fryer, Oakville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/439,304

(22) Filed: Feb. 12, 2024

(51) Int. Cl.
| | | |
|---|---|---|
| *F01D 21/00* | (2006.01) | |
| *F01D 21/04* | (2006.01) | |
| *F02C 3/08* | (2006.01) | |
| *F04D 17/10* | (2006.01) | |
| *F04D 29/42* | (2006.01) | |
| *F04D 29/44* | (2006.01) | |

(52) U.S. Cl.
CPC ............ *F01D 21/045* (2013.01); *F02C 3/08* (2013.01); *F04D 17/10* (2013.01); *F04D 29/4206* (2013.01); *F04D 29/441* (2013.01); *F05D 2260/311* (2013.01)

(58) Field of Classification Search
CPC .......... F01D 21/045; F05B 2260/3011; F05D 2260/311
See application file for complete search history.

(56) References Cited

U.S. PATENT DOCUMENTS

| | | | | |
|---|---|---|---|---|
| 4,392,623 A | * | 7/1983 | Munsen | B64C 25/10 244/102 R |
| 4,557,661 A | * | 12/1985 | Fischer | B25J 19/063 414/730 |
| 5,484,217 A | * | 1/1996 | Carroll | E01F 9/642 248/548 |
| 5,839,866 A | * | 11/1998 | Moen | E21B 41/00 248/909 |
| 5,988,598 A | * | 11/1999 | Sicking | E01F 15/0461 256/DIG. 5 |
| 6,254,063 B1 | * | 7/2001 | Rohde | E01F 15/0476 256/DIG. 5 |
| 6,464,454 B1 | | 10/2002 | Kotkaniemi | |
| 6,854,956 B2 | | 2/2005 | Miwata | |
| 7,329,097 B2 | | 2/2008 | Kirk | |
| 7,874,136 B2 | | 1/2011 | Heyerman | |
| 8,038,126 B1 | * | 10/2011 | Albritton | E01F 15/0461 403/2 |
| 8,166,746 B2 | | 5/2012 | Heyerman | |
| 8,182,216 B2 | | 5/2012 | Lhoest | |

(Continued)

OTHER PUBLICATIONS

EP Search Report for EP Patent Application No. 25157395.2 dated Jun. 27, 2025.

*Primary Examiner* — Katheryn A Malatek
(74) *Attorney, Agent, or Firm* — Getz Balich LLC

(57) ABSTRACT

A centrifugal compressor is provided that includes an impeller, a diffuser, a compressor scroll, a bearing housing structure, and a coupling ring. The impeller is configured to rotate about a rotational axis. The diffuser is disposed radially outside of the impeller. The coupling ring is connected to the compressor scroll by a plurality of first fasteners and connected to the bearing housing structure by a plurality of second fasteners. The compressor is configured such that the compressor scroll will decouple from the bearing housing structure as a result of an impeller failure.

19 Claims, 7 Drawing Sheets

(56) References Cited

U.S. PATENT DOCUMENTS

| | | | |
|---|---|---|---|
| 9,777,592 B2 | 10/2017 | Denis | |
| 12,044,181 B1* | 7/2024 | Danley | F01D 21/045 |
| 2011/0305554 A1 | 12/2011 | Chen | |
| 2016/0265382 A1* | 9/2016 | Annati | F02B 37/24 |
| 2021/0222589 A1* | 7/2021 | Lefebvre | F01D 25/30 |

* cited by examiner

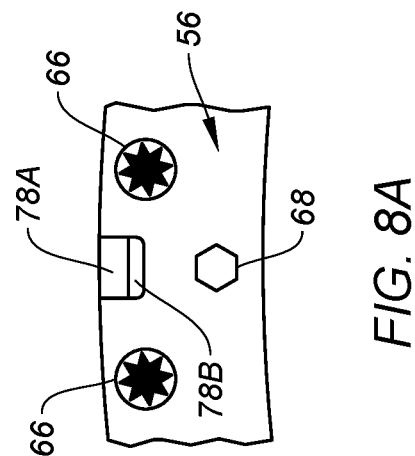
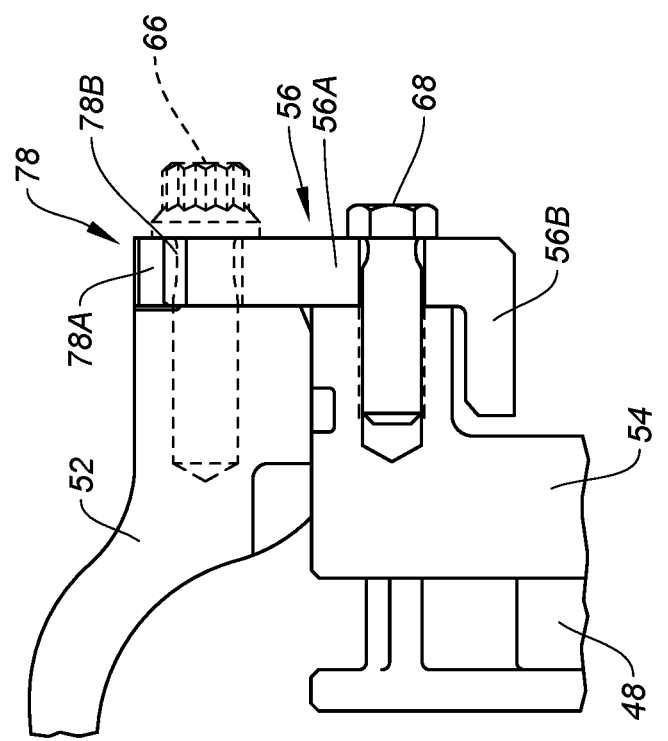

COMPRESSOR FRANGIBLE CONTAINMENT STRUCTURE

BACKGROUND OF THE INVENTION

1. Technical Field

The present disclosure relates to gas turbine engines in general, and to rotating component containment structures in particular.

2. Background Information

A rotor (e.g., turbine disc, compressor rotor, compressor impeller, or the like) having an inherent defect within its material structure may fail during operation and fracture into a plurality of high energy discrete fragments. Such a failure may occur during an overspeed event when the rotor is spun at a higher than normal angular velocity and is consequently subject to higher levels of stress. It is known that aircraft engine turbine and compressor discs that fail often break into three high energy fragments, each representing a third of the rotating component (e.g., the fractures may be about 120 degrees apart from one another). Such a failure is sometimes referred to as a "tri-hub failure". An uncontained failure of a gas turbine engine rotor may be defined as a rotor failure that produces fragments that penetrate and escape the confines of the engine casing. It would be desirable to provide a system with improved ability to contain the fragments of a failed rotating component.

SUMMARY

According to an aspect of the present disclosure, a centrifugal compressor is provided that includes an impeller, a diffuser, a compressor scroll, a bearing housing structure, and a coupling ring. The impeller is configured to rotate about a rotational axis. The diffuser is disposed radially outside of the impeller. The coupling ring is connected to the compressor scroll by a plurality of first fasteners and connected to the bearing housing structure by a plurality of second fasteners. The compressor is configured such that the compressor scroll will decouple from the bearing housing structure as a result of an impeller failure.

In any of the aspects or embodiments described above and herein, the plurality of second fasteners may be configured to mechanically fail before the plurality of first fasteners are configured to mechanically fail, thereby decoupling the compressor scroll from the bearing housing structure.

In any of the aspects or embodiments described above and herein, the plurality of second fasteners may consist of "N" number of second fasteners, and the plurality of first fasteners may consist of "M" number of first fasteners, wherein N and M are integers and M is greater than N.

In any of the aspects or embodiments described above and herein, each first fastener may have a first mechanical strength, and each second fastener may have a second mechanical strength, and the first mechanical strength may be greater than the second mechanical strength.

In any of the aspects or embodiments described above and herein, each first fastener may have a first diameter, and each second fastener may have a second diameter, and the first diameter may be greater than the second diameter.

In any of the aspects or embodiments described above and herein, each second fastener may have a failure feature.

In any of the aspects or embodiments described above and herein, each first fastener may have a first tensile strength, and each second fastener may have a second tensile strength, and the first tensile strength may be greater than the second tensile strength.

In any of the aspects or embodiments described above and herein, each first fastener may have a first shear strength, and each second fastener may have a second shear strength, and the first shear strength may be greater than the second shear strength.

In any of the aspects or embodiments described above and herein, each first fastener may be in threaded engagement with the compressor scroll and each second fastener may be in threaded engagement with the bearing housing structure.

In any of the aspects or embodiments described above and herein, the coupling ring may include a plurality of first apertures and a plurality of second apertures, wherein each first aperture is configured to receive a respective first fastener, and each second aperture is configured to receive a respective second fastener, and the first apertures are disposed radially outside of the second apertures.

In any of the aspects or embodiments described above and herein, the coupling ring may have an L-shaped configuration.

In any of the aspects or embodiments described above and herein, the coupling ring may include a first portion and a second portion, and the first portion may be disposed orthogonally to the second portion.

In any of the aspects or embodiments described above and herein, the coupling ring may have a planar configuration.

In any of the aspects or embodiments described above and herein, the compressor may include a plurality of locating pins in communication with the coupling ring and the bearing housing structure.

In any of the aspects or embodiments described above and herein, the compressor scroll may include a compressor scroll support structure, and the compressor may include a plurality of anti-rotation features configured to mate the compressor scroll support structure with the coupling ring.

In any of the aspects or embodiments described above and herein, one of the compressor scroll support structure or the coupling ring may include a male component of the anti-rotation features, and the other of the compressor scroll support structure or the coupling ring may include a female component of the anti-rotation features, and the female component of the anti-rotation features may be configured to receive the male component of the anti-rotation features.

According to an aspect of the present disclosure, a propulsion system is provided that includes a thermal engine, a power turbine section, a compressor section, first piping, and second piping. The thermal engine has an intake port and an exhaust port. The power turbine section has an inlet port and at least one rotor stage. The compressor section has an impeller, a diffuser, a compressor scroll, a bearing housing structure, and a coupling ring. The impeller is configured to rotate about a rotational axis. The diffuser is disposed radially outside of the impeller. The compressor scroll has an outlet port. The coupling ring is connected to the compressor scroll by a plurality of first fasteners and is connected to the bearing housing structure by a plurality of second fasteners. The compressor is configured such that the compressor scroll will decouple from the bearing housing structure as a result of an impeller failure. The power turbine is in drive communication with the compressor section. The first piping is configured to provide fluid communication between the outlet port of the compressor scroll to the intake port of the thermal engine. The second piping is configured to provide fluid communication between the exhaust port of the thermal engine to the inlet port of the power turbine.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

FIG. 8 is a diagrammatic view of an anti-rotation feature embodiment.

FIG. 8A is a diagrammatic planar view of the anti-rotation feature embodiment shown in FIG. 8.

DETAILED DESCRIPTION

Figure 1:
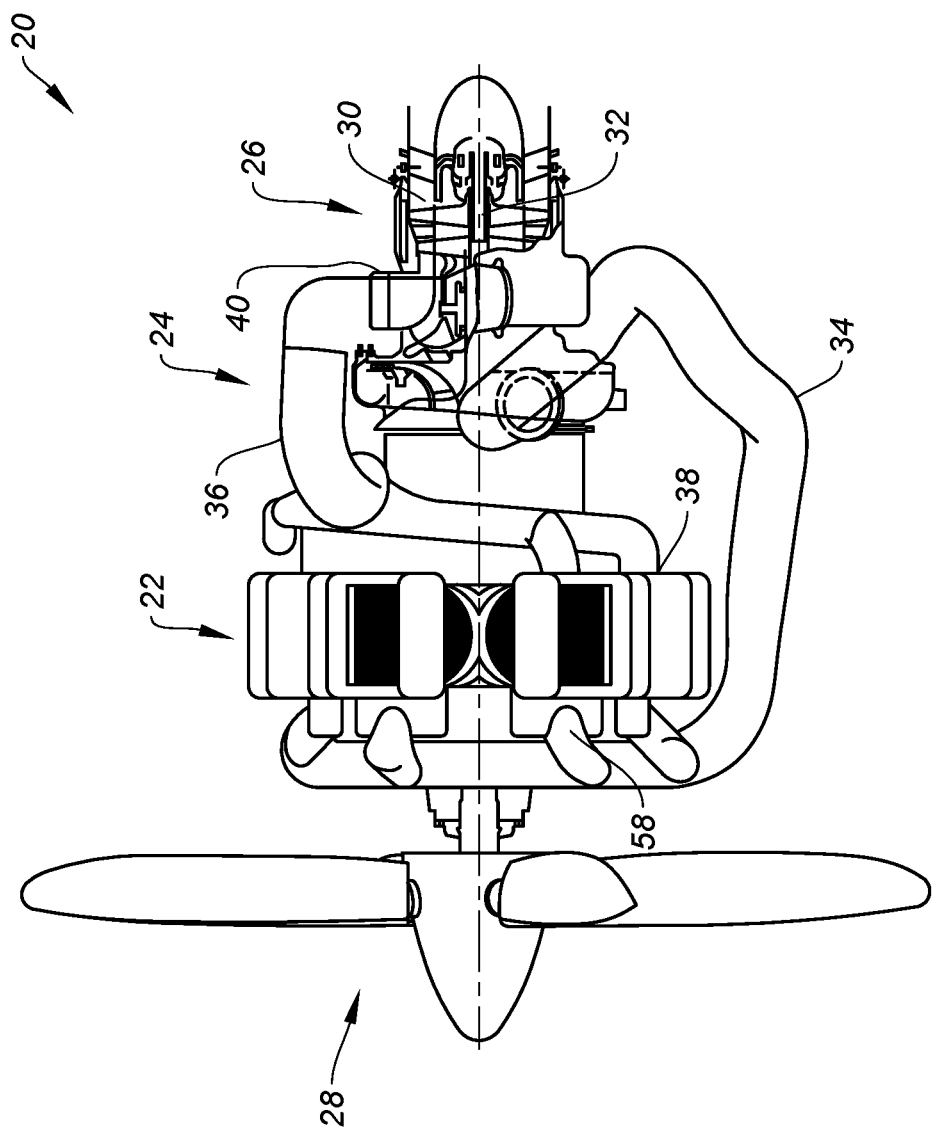
FIG. 1 is a diagrammatic representation of a propulsion system for an aircraft.

FIG. 1 diagrammatically illustrates a propulsion system 20 for an aircraft. The propulsion system 20 includes a thermal engine 22, a compressor section 24, and a power turbine section 26. In the embodiment shown in FIG. 1, the propulsion system 20 is shown including a propeller 28. The present disclosure does not require a propeller 28. The power turbine section 26 includes at least one rotor stage 30 and a shaft 32 that extends from the power turbine section 26 to the compressor section 24. The power turbine section 26 is configured to drive a portion of the compressor section 24. First piping 34 (or other fluid containment structure) extends between the compressor section (e.g., an outlet port of a compressor scroll) and the thermal engine 22 (e.g., one or more intake ports 58 of the thermal engine 22). Second piping 36 (or other fluid containment structure) extends between the thermal engine 22 (e.g., one or more exhaust ports 38 of the thermal engine 22) and the power turbine section 26 (e.g., one or more inlet ports 40 of the power turbine section 26). A non-limiting example of a thermal engine 22 that may be used within the propulsion system 20 is a rotary engine.

Figure 2:
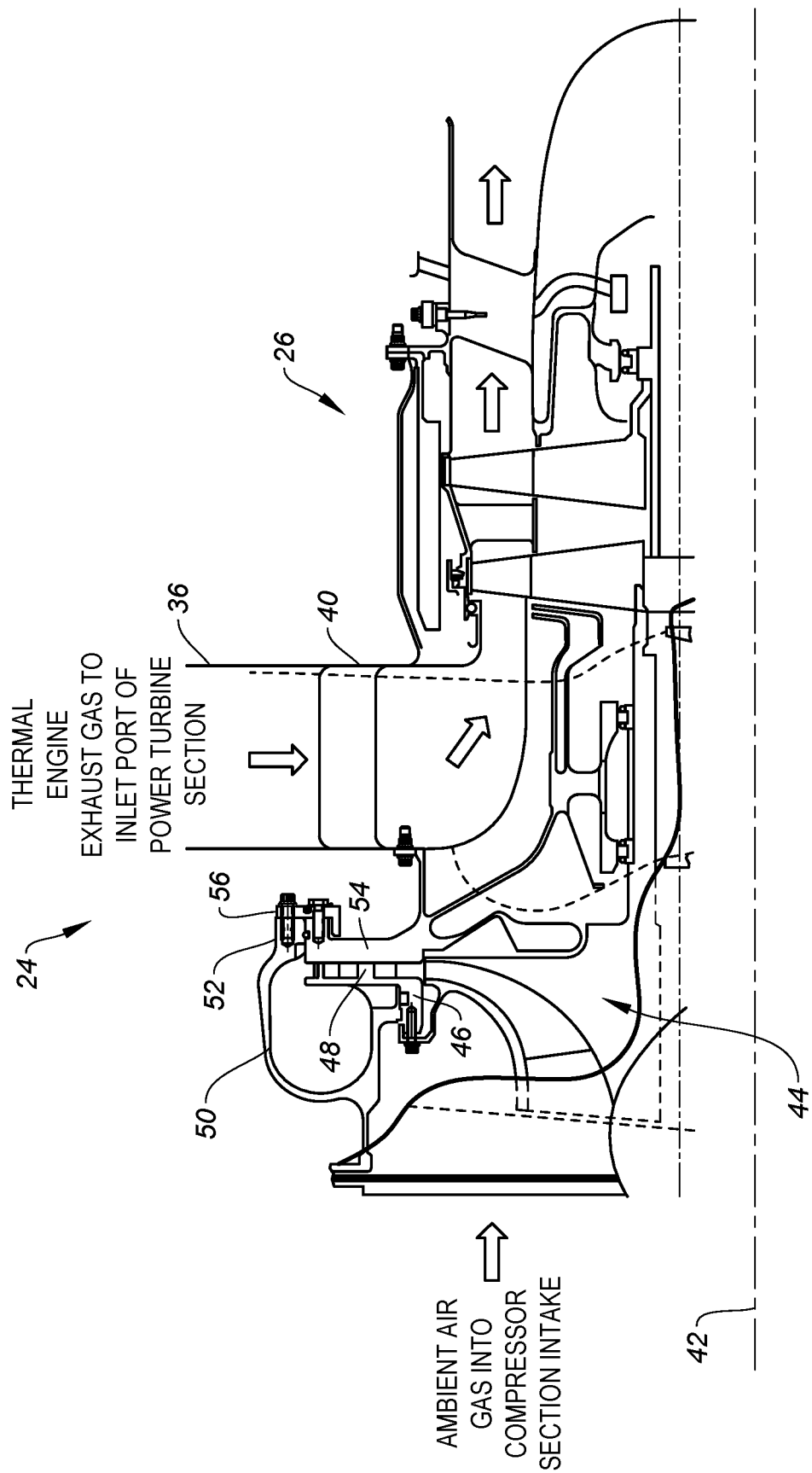
FIG. 2 diagrammatically illustrates a sectioned partial view of the propulsion system shown within FIG. 1.

FIG. 2 diagrammatically illustrates a sectioned partial view of the propulsion system 20 shown within FIG. 1. The compressor section 24 is an annular structure, with components rotatable about a rotational axis 42. The compressor section 24 includes an impeller 44, a front diffuser 46, a rear diffuser 48, a compressor scroll 50, a compressor scroll support structure 52, a bearing housing support structure 54, and a coupling ring 56. A portion of the bearing housing support structure 54 is contiguous with a portion of the compressor section 24. The coupling ring 56 is in communication with the compressor section 24 and the bearing housing support structure 54.

Referring to FIGS. 1 and 2, during operation of the propulsion system 20, the combustion of fuel within the thermal engine 22 produces exhaust gas at an elevated temperature and pressure. The exhaust gas passes from the one or more exhaust ports 38 of the thermal engine 22 to the one or more inlet ports 40 of the power turbine section 26 via the second piping 36. The exhaust gas passes through the power turbine section 26, driving the rotor stage(s) 30 and is then passed outside of the power turbine section 26; e.g., into the ambient air. The rotor stages 30 drive the impeller 44 of the compressor section 24. The impeller 44 draws a volumetric flow of ambient air into the compressor section intake and works it to an elevated pressure. The worked air flow exits the compressor section 24 and passes to the intake ports 58 of the thermal engine 22 where it is mixed with the fuel for combustion.

Figure 3:
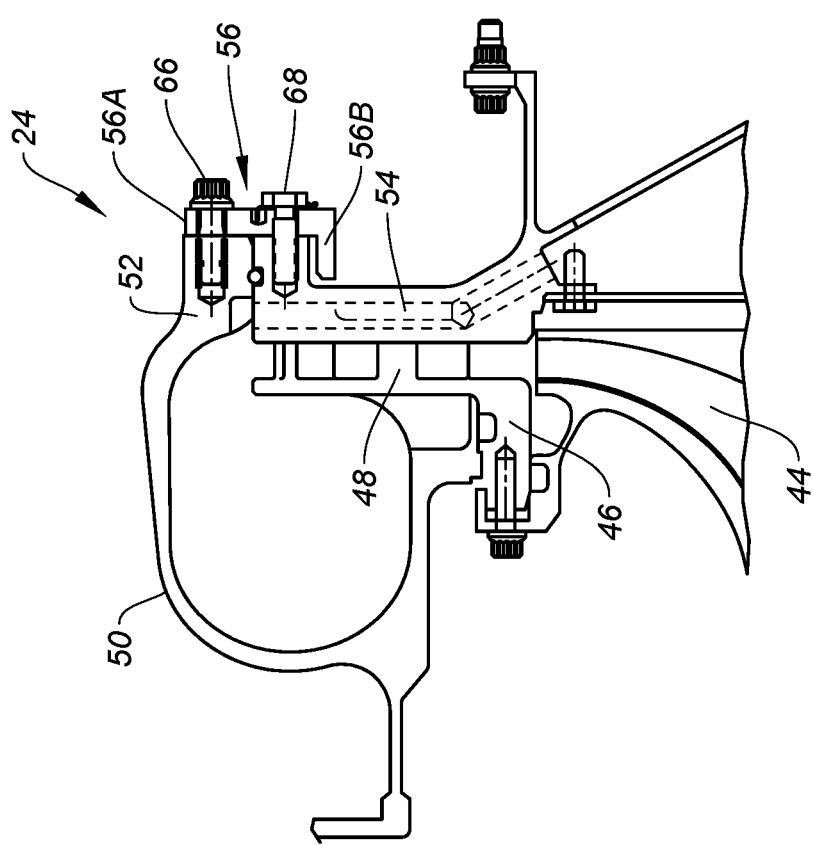
FIG. 3 is an enlarged view of a portion of the compressor section shown in FIG. 2.
Figure 4:
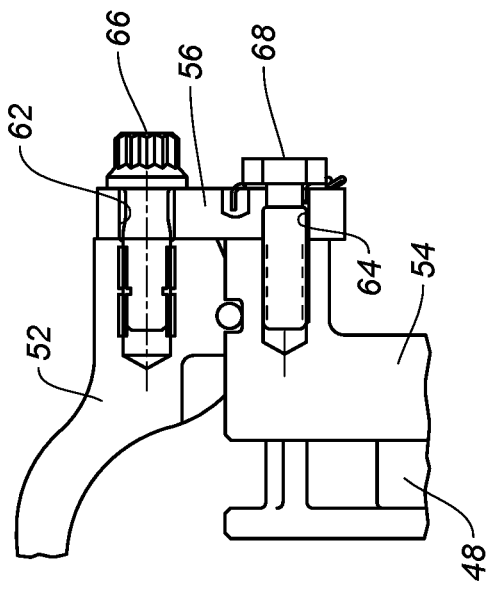
FIG. 4 is an enlarged view of a portion of the compressor section shown in FIG. 3, illustrating a coupling ring embodiment.
Figure 5:
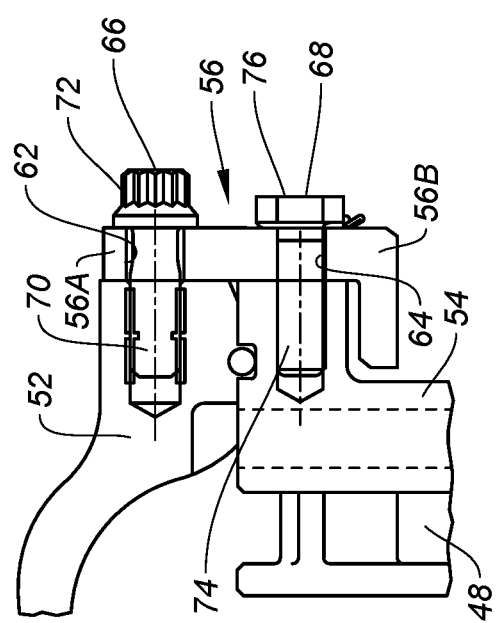
FIG. 5 is an enlarged view of a portion of the compressor section shown in FIG. 3, illustrating a coupling ring embodiment.
Figure 6:
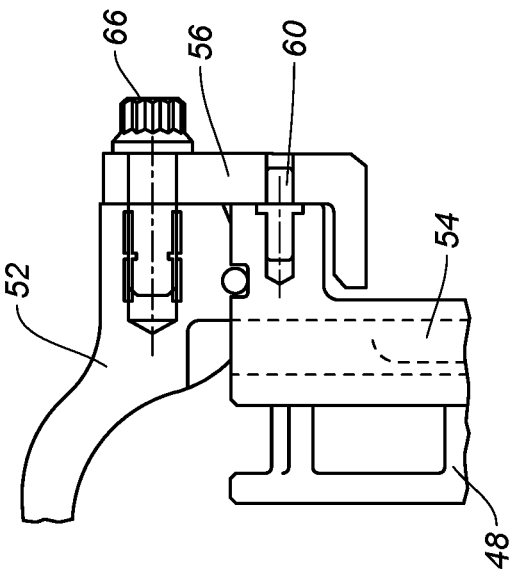
FIG. 6 is a diagrammatic view of the compressor section shown in FIG. 3, illustrating a locating pin.

FIGS. 3-5 provide further enlarged diagrammatic views of a portion of the compressor section 24. FIGS. 4 and 5 illustrate the compressor scroll support structure 52, the bearing housing support structure 54, and embodiments of the coupling ring 56. FIG. 6 diagrammatically illustrates an embodiment that includes one of a plurality of locating pins 60 that may be included.

The coupling ring 56 includes a plurality of first apertures 62 disposed at a first radius from the rotational axis 42 and a plurality of second apertures 64 disposed at a second radius from the rotational axis 42. The first radius is greater than the second radius. The coupling ring 56 embodiment shown in FIG. 4 includes a first portion 56A and a second portion 56B. This coupling ring 56 embodiment may be described as "L-shaped" or "hook-shaped". In the specific embodiment shown in FIG. 4, the coupling ring first portion 56A extends in a first orthogonal direction (e.g., radially) and includes the first and second apertures 62, 64 for respectively receiving first fasteners 66 and second fasteners 68 (and locating pins when included), and the coupling ring second portion 56B extends in a second orthogonal direction (e.g., axially), thereby forming the "L-shape" or "hook-shape". The coupling ring second portion 56B is disposed at a radial distance less than the second apertures. The present disclosure coupling ring 56 embodiments having an "L-shape" or "hook-shape" are not limited to first and second portions that are perpendicular one another. FIG. 5 diagrammatically illustrates a coupling ring 56 embodiment that is substantially planar and includes apertures 62, 64 for receiving the first and second fasteners 66, 68 (and locating pins 60 when included). The present disclosure is not limited to the coupling ring 56 embodiments shown in FIGS. 4 and 5.

As can be seen in FIGS. 2-6, the coupling ring 56 is attached via a plurality of first fasteners 66 and a plurality of second fasteners 68. The first fasteners 66 are disposed to attach the coupling ring 56 to the compressor scroll support structure 52 and the second fasteners 68 are disposed to attach the coupling ring 56 to the bearing housing support structure 54. The first fasteners 66 (FF) may include a FF shank 70 and a FF head 72 disposed at an axial end of the FF shank 72 (see FIG. 4). The FF head 72 may be configured to permit the respective first fastener 66 to be driven by a tool; e.g., the FF head 72 may have a hexagonal configuration, a socket cap configuration, a torx head configuration, or the like. The present disclosure is not limited to any particular head configuration for the first fasteners 66. The FF shank 70 may be uniform in diameter or may vary in diameter. The entire axial length of the FF shank 70 may be threaded or less than all of the entire length of the FF shank 70 may be threaded. The first fasteners 66 are configured to be threadedly engaged with correspondingly threaded apertures disposed within the compressor scroll support structure 52. The second fasteners 68 (SF) may include a SF shank 74 and a SF head 76 disposed at an axial end of the SF shank 74 (see FIG. 4). The SF head 76 may be configured to permit the respective second fastener 68 to be driven by a tool; e.g., the SF head 76 may have a hexagonal configuration, a socket cap configuration, a torx head configuration, or the like. The present disclosure is not limited to any particular SF head 76 configuration for the second fasteners 68. The SF shank 74 may be uniform in diameter or may vary in diameter. The entire axial length of the SF shank 74 may be threaded or less than the entire axial length of the SF shank 74 may be threaded. The second fasteners 68 are configured to be threadedly engaged with correspondingly threaded apertures disposed within the bearing housing support structure 54.

Figure 7A:
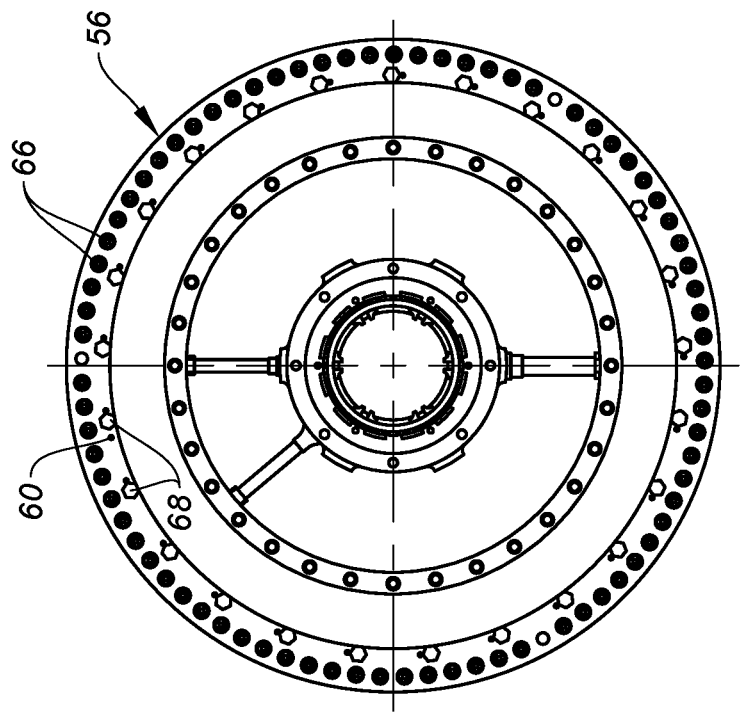
FIG. 7A is a planar view of the bearing housing support structure shown in FIG. 7.
Figure 7:
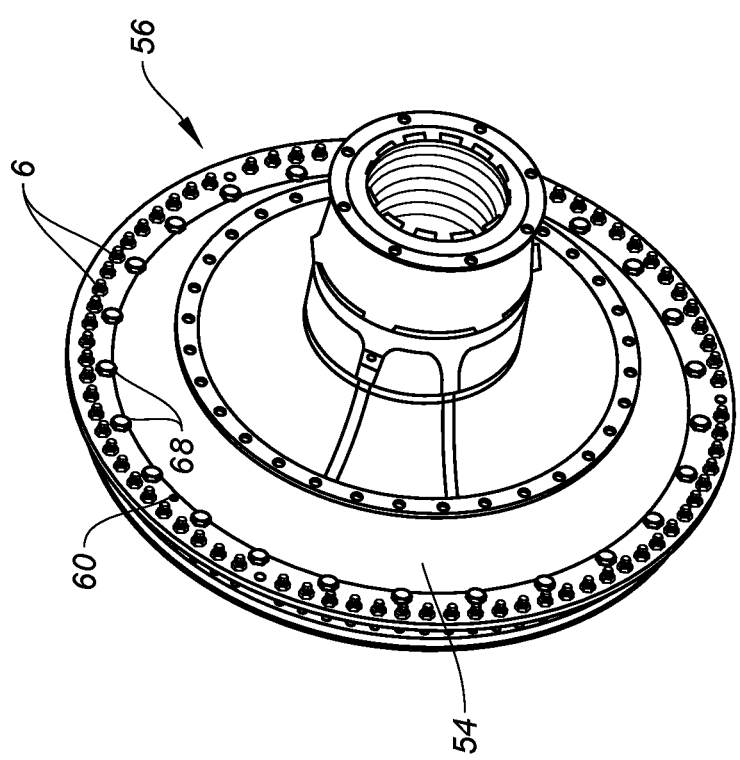
FIG. 7 is a diagrammatic perspective view of a bearing housing support structure, including a coupling ring attached by first and second fasteners.

In those embodiments that include locating pins 60 (e.g., see FIG. 6), the locating pins 60 may be disposed to be engaged with the coupling ring 56 and with the bearing housing support structure 54; e.g., at a radial position approximately aligned with the second fasteners 68, disposed between adjacent second fasteners 68. FIG. 7 is a perspective forward looking view showing the bearing housing support structure 54, the attached coupling ring 56, first and second fasteners 66, 68, and locating pins 60. FIG. 7A is a planar view of the bearing housing support structure 54 shown in FIG. 7.

Rotating a defective compressor impeller 44 to an elevated rotational speed may cause the impeller 44 to fracture and break into a plurality of high energy discrete fragments; e.g., a tri-hub failure. The rotational speed of the impeller at the time of the fracture imparts a significant amount of kinetic energy to the impeller fragments. The kinetic energy of the fragments will likely cause the fragments to travel in a direction that includes an outer radial component as well as a circumferential component. The impeller fragments will contact and transmit their kinetic energy to the normally static front and rear diffusers 46, 48 and the structure to which the front and rear diffusers 46, 48 are attached. Embodiments of the present disclosure provide a containment structure that yields when subjected to the kinetic energy of the impeller fragments while maintaining axial retention capability. More specifically, embodiments of the present disclosure permit a portion of the impeller containment structure (e.g., the front and rear diffusers 46, 48 disposed radially outside of the impeller 44) to decouple from other structural members; e.g., the compressor scroll 50. The decoupling mitigates or avoids transfer of the kinetic energy to the compressor scroll 50.

In some embodiments of the present disclosure, the first fasteners 66 and second fasteners 68 are configured relative to one another so that an applied load (produced by the kinetic energy of the impeller fragments) will result in the second fasteners 68 mechanically failing before the first fasteners 66 mechanically fail. The specific nature of the forces applied to the containment structure (including the first and second fasteners 66, 68) may vary depending on the specifics of the failure. The present disclosure is not limited to any particular mode of mechanical failure for the second fasteners; e.g., the mechanical failure may result entirely from a shear force loading, or may result entirely from a tension force loading, or any combination thereof.

The present disclosure may be configured so that the second fasteners 68 mechanically fail before the first fasteners 66 mechanically fail in a variety of different ways. As a first example, the number of second fasteners 68 (e.g., "N" number of second fasteners 68, where "N" is an integer) may be less than the number of first fasteners 66 (e.g., "M" number of first fasteners 66, where "M" is an integer, and M>N). It is understood that the applied load (produced by the kinetic energy of the impeller fragments) will be distributed amongst both the first fasteners 66 and the second fasteners 68. In an embodiment wherein the number of first fasteners 66 is greater than the number of second fasteners 68, the amount of distributed load applied to each second fastener 68 will exceed the amount of distributed load applied to each first fastener 66 if the number of first fasteners 66 exceeds the number of second fasteners 68.

In another example, the second fasteners 68 may have a tensile strength less than the tensile strength of the first fasteners 66, or the second fasteners 68 may have a shear strength less than the shear strength of the first fasteners 66, or both. A difference in tensile strength or shear strength (collectively referred to herein as "mechanical strength") may be based on the first and second fasteners 66, 68 comprising different materials, or it may be based on the first and second fasteners 66, 68 having different geometries; e.g., different diameters. In some embodiments, the second fasteners 68 may include a failure feature that causes them to have a lower mechanical strength than the first fasteners 66. Non-limiting examples of a failure feature include a reduced radius section, or a failure zone defined by a notch or an aperture in the shank of the second fastener, or the like. The present disclosure is not limited to any particular second fastener configuration that results in the second fasteners 68 having lower mechanical strength than the first fasteners 66.

The present disclosure is not limited to the above examples of how the second fasteners 68 may be configured to mechanically fail before the first fasteners 66 mechanically fail, and may include some combination of the above first and second fastener configurations.

Referring to FIGS. 8 and 8A, in some embodiments the compressor scroll support structure 52 and the coupling ring 56 may include one or more anti-rotation features 78 to inhibit relative rotation between the compressor scroll support structure 52 and the coupling ring 56. These anti-rotation features 78 may be configured as mating male and female features. FIGS. 8 and 8A diagrammatically illustrate a non-limiting example of mating anti-rotation features in the form of a lug 78A extending out from the compressor scroll support structure 52 and a slot 78B disposed within the coupling ring 56. The slot 78B is configured to receive the lug 78A when the coupling ring 56 is attached to the compressor scroll support structure 52. The mating lug and slot arrangement could be alternatively configured such that the coupling ring 56 includes the lug and the compressor scroll support structure 52 includes the slot. A plurality of anti-rotation features 78 may be utilized, circumferentially spaced apart from one another. These anti-rotation features 78 may be configured to provide additional mechanical strength at the junction of the compressor scroll support structure 52 and the coupling ring 56 to ensure the second fasteners 68 mechanically fail before the first fasteners 66. In some embodiments, the anti-rotation features 78 may provide sufficient additional mechanical strength at the junction of the compressor scroll support structure 52 and the coupling ring 56 such that the first and second fasteners 68 may possess the same mechanical strength characteristics, but the second fasteners 68 will mechanically fail before the first fasteners 66 because the load that would otherwise be applied solely to the first fasteners 66 is shared between the first fasteners 66 and the anti-rotation features 78.

Figure 9:
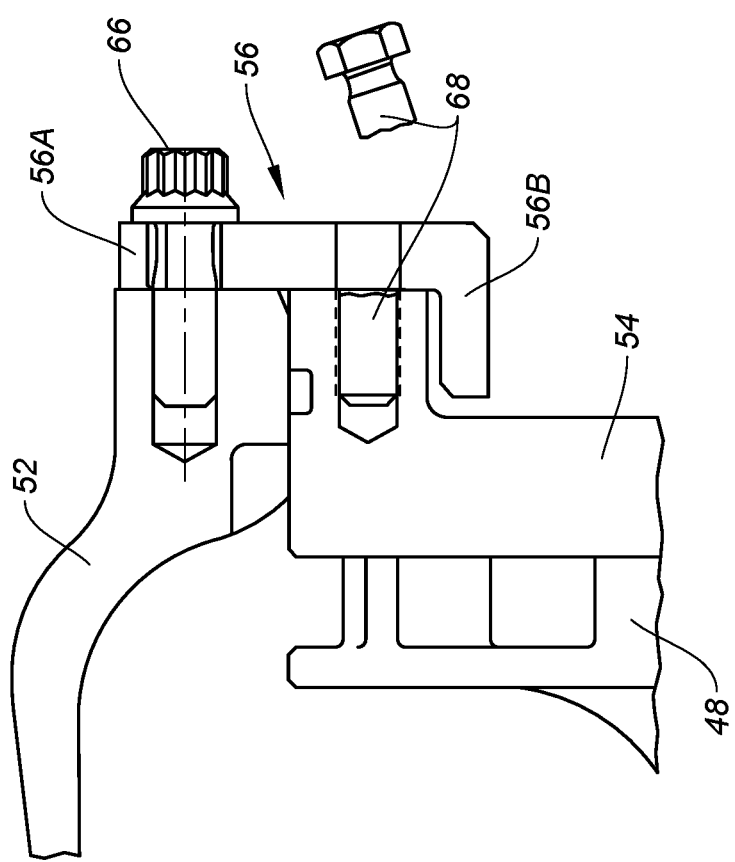
FIG. 9 is a diagrammatic view of a portion of a compressor section, showing a second fastener that has failed.

FIG. 9 diagrammatically illustrates a second fastener 68 fracturing as a result of a failure event in which the compressor impeller 44 has fractured and imparted kinetic energy to a portion of the impeller containment structure (e.g., the front and rear diffuser 46, 48 disposed radially outside of the impeller 44 and the coupling ring 56) causing the second fasteners 68 attaching the impeller containment structure to the other structural members (e.g., the compressor scroll support structure 52) to fail. As a result, a portion of the impeller containment structure is decoupled from the structural members. A portion of the impeller containment structure (e.g., the front and rear diffuser) is permitted to travel some amount (e.g., circumferentially) to dissipate the applied kinetic energy. At the same time, the impeller containment structure (including the coupling ring 56) retains its axial retention capability. The coupling ring 56 embodiment that has an "L-shape" or "hook-shape" is understood to provide the additional capability of capturing a portion of the diffuser structure between the hook portion (e.g., the coupling ring second portion 56B) and the compressor scroll support structure 52. Hence, the present disclosure impeller containment structure is configured to retain the impeller fragments while preventing rearward axial displacement.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc. The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. A centrifugal compressor, comprising:
an impeller configured to rotate about a rotational axis;
a diffuser disposed radially outside of the impeller;
a compressor scroll;
a bearing housing structure;
a coupling ring connected to the compressor scroll by a plurality of first fasteners and connected to the bearing housing structure by a plurality of second fasteners;
wherein the compressor is configured such that the compressor scroll will decouple from the bearing housing structure as a result of an impeller failure;
wherein the plurality of second fasteners are configured to mechanically fail before the plurality of first fasteners are configured to mechanically fail, thereby decoupling the compressor scroll from the bearing housing structure.

2. The compressor of claim 1, wherein the plurality of second fasteners consists of "N" number of second fasteners, and the plurality of first fasteners consists of "M" number of first fasteners, wherein N and M are integers and M is greater than N.

3. The compressor of claim 1, wherein each said first fastener of the plurality of first fasteners has a first mechanical strength, and each said second fastener of the plurality of second fasteners has a second mechanical strength, and the first mechanical strength is greater than the second mechanical strength.

4. The compressor of claim 3, wherein each said first fastener of the plurality of first fasteners has a first diameter, and each said second fastener of the plurality of second fasteners has a second diameter, and the first diameter is greater than the second diameter.

5. The compressor of claim 1, wherein each said second fastener of the plurality of second fasteners has a failure feature.

6. The compressor of claim 1, wherein each said first fastener of the plurality of first fasteners has a first tensile strength, and each said second fastener of the plurality of second fasteners has a second tensile strength, and the first tensile strength is greater than the second tensile strength.

7. The compressor of claim 1, wherein each said first fastener of the plurality of first fasteners has a first shear strength, and each said second fastener of the plurality of second fasteners has a second shear strength, and the first shear strength is greater than the second shear strength.

8. The compressor of claim 1, wherein each first fastener is in threaded engagement with the compressor scroll and each second fastener is in threaded engagement with the bearing housing structure.

9. The compressor of claim 1, wherein the coupling ring includes a plurality of first apertures and a plurality of second apertures, wherein each first aperture of the plurality of first apertures is configured to receive a respective first fastener, and each second aperture of the plurality of second apertures is configured to receive a respective second fastener, wherein the plurality of first apertures are disposed radially outside of the plurality of second apertures.

10. The compressor of claim 9, wherein the coupling ring has an L-shaped configuration.

11. The compressor of claim 10, wherein the coupling ring includes a first portion and a second portion, and the first portion is disposed orthogonally to the second portion.

12. The compressor of claim 9, wherein the coupling ring has a planar configuration.

13. The compressor of claim 1, further comprising a plurality of locating pins in communication with the coupling ring and the bearing housing structure.

14. The compressor of claim 1, wherein the compressor scroll includes a compressor scroll support structure, and the compressor further comprises a plurality of anti-rotation features configured to mate the compressor scroll support structure with the coupling ring.

15. The compressor of claim 14, wherein one of the compressor scroll support structure or the coupling ring includes a male component of the anti-rotation features, and the other of the compressor scroll support structure or the coupling ring includes a female component of the anti-rotation features, and the female component of the anti-rotation features is configured to receive the male component of the anti-rotation features.

16. A propulsion system, comprising:
a thermal engine having an intake port and an exhaust port;
a power turbine section having an inlet port and at least one rotor stage;
a compressor section having:
an impeller configured to rotate about a rotational axis;
a diffuser disposed radially outside of the impeller;
a compressor scroll having an outlet port;
a bearing housing structure;
a coupling ring connected to the compressor scroll by a plurality of first fasteners and connected to the bearing housing structure by a plurality of second fasteners;
wherein the compressor is configured such that the compressor scroll will decouple from the bearing housing structure as a result of an impeller failure;
wherein the power turbine is in drive communication with the compressor section;
a first piping configured to provide fluid communication between the outlet port of the compressor scroll to the intake port of the thermal engine; and
a second piping configured to provide fluid communication between the exhaust port of the thermal engine to the inlet port of the power turbine,
wherein the plurality of second fasteners are configured to mechanically fail before the plurality of first fasteners are configured to mechanically fail, thereby decoupling the compressor scroll from the bearing housing structure.

17. The propulsion system of claim 16, wherein the coupling ring includes a plurality of first apertures and a plurality of second apertures, wherein each first aperture of the plurality of first apertures is configured to receive a respective first fastener, and each second aperture of the plurality of second apertures is configured to receive a respective second fastener, wherein the plurality of first apertures are disposed radially outside of the plurality of second apertures.

18. The propulsion system of claim 17, wherein the coupling ring has an L-shaped configuration.

19. A centrifugal compressor, comprising:
an impeller configured to rotate about a rotational axis;
a diffuser disposed radially outside of the impeller;
a compressor scroll;
a bearing housing structure;
a coupling ring including a first portion connected to the compressor scroll by a plurality of first fasteners, the coupling ring including a second portion connected to the bearing housing structure by a plurality of second fasteners, and the first portion is disposed orthogonally to the second portion;
wherein the second portion of the coupling ring is radially inward of a portion of the bearing housing structure;
wherein the compressor is configured such that the compressor scroll will decouple from the bearing housing structure as a result to an impeller failure;
wherein the coupling ring is configured to capture and axially retain the bearing housing as a result of the impeller failure; and
wherein the plurality of second fasteners are configured to mechanically fail before the plurality of first fasteners are configured to mechanically fail, thereby decoupling the compressor scroll from the bearing housing structure.

* * * * *